United States Patent [19]

Eisenhardt

[11] 4,019,755
[45] Apr. 26, 1977

[54] HITCH ASSEMBLY FOR MOUNTING A TRANSVERSE BEAM ON A THREE-POINT HITCH

[75] Inventor: Fred W. Eisenhardt, Fargo, N. Dak.

[73] Assignee: Alloway Manufacturing, Inc., Fargo, N. Dak.

[22] Filed: May 9, 1975

[21] Appl. No.: 576,229

Related U.S. Application Data

[63] Continuation-in-part of Ser. No. 474,048, May 28, 1974, abandoned.

[52] U.S. Cl. .......................... 280/490 A; 172/439; 172/451; 172/679; 172/680
[51] Int. Cl.² ........................................ A01B 59/06
[58] Field of Search .......... 172/248, 439, 440, 441, 172/442, 443, 444, 445, 446, 447, 448, 449, 450, 451, 677, 679, 680, 47; 280/456 A, 460 A, 461 A, 490 A, 415 R, 415 A; 403/385, 389, 400

[56] References Cited

UNITED STATES PATENTS

| | | | |
|---|---|---|---|
| 2,737,103 | 3/1956 | Renault | 172/762 |
| 2,745,330 | 5/1956 | Nelson | 280/461 A |
| 3,275,341 | 9/1966 | Ralston | 280/460 A |
| 3,642,333 | 2/1972 | Eisenhardt et al. | 172/763 X |
| 3,817,642 | 6/1974 | Eisenhardt | 403/385 |
| 3,825,358 | 7/1974 | Eisenhardt et al. | 403/385 X |

FOREIGN PATENTS OR APPLICATIONS 202,798   8/1956   Australia .................... 280/456 A Primary Examiner—Richard T. Stouffer
Attorney, Agent, or Firm—Burd, Braddock & Bartz

[57] ABSTRACT

An earthworking implement mounted on a three-point hitch of a draft vehicle with a hitch assembly. The hitch assembly has members mounted in clamps secured to a main transverse beam. Two of these members include lower forward projecting portions and a third member therebetween has an upper forward projecting portion. The two lower portions are connected to a transverse bar, which is attached to the draft links of the three-point hitch. The upper portion is connected to the control link of the three-point hitch. These members are individually adjustable, whereby they may be adjusted to fit variations in structure of three-point hitches. A plurality of parallel linkages movably connect a transverse tool bar to the beam. Row guide units having guide and gauge wheels and furrowing tools are mounted with clamps to the tool bar. Earthworking tools, herbicide incorporators and seed planters can be mounted with clamps to the tool bar.

13 Claims, 13 Drawing Figures

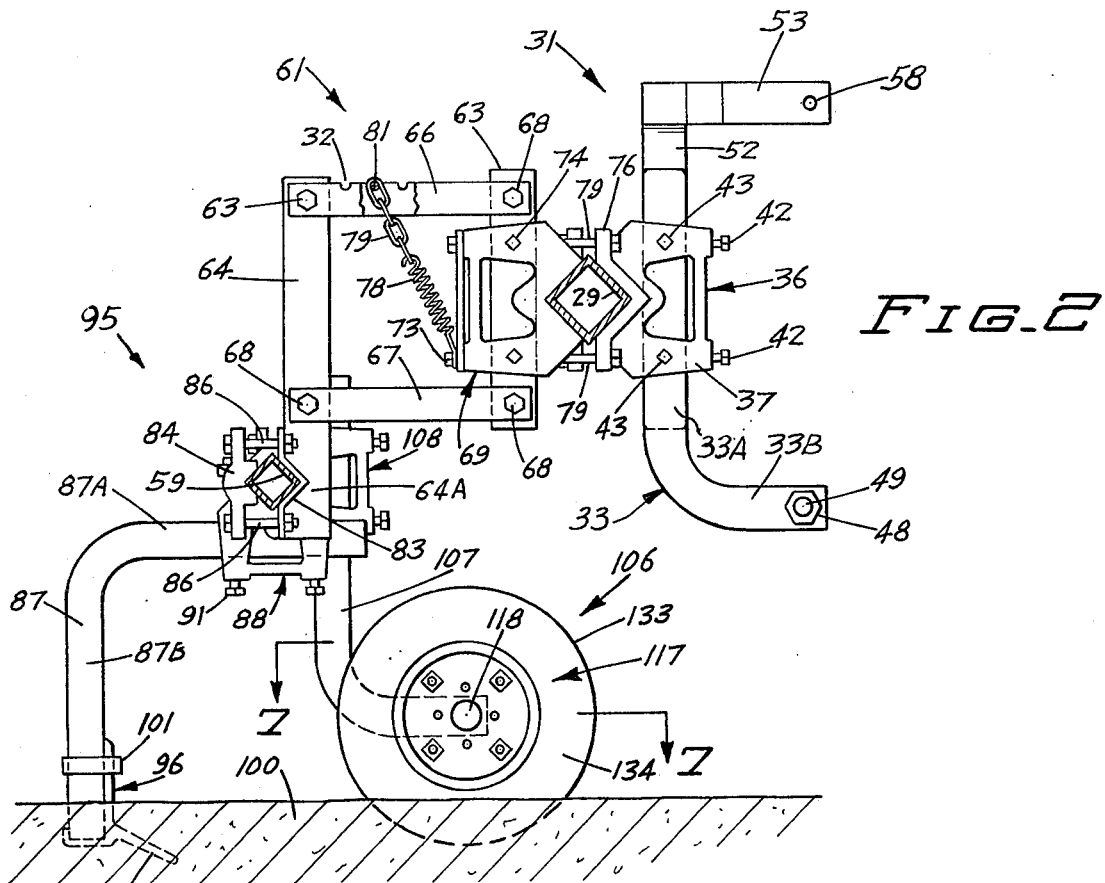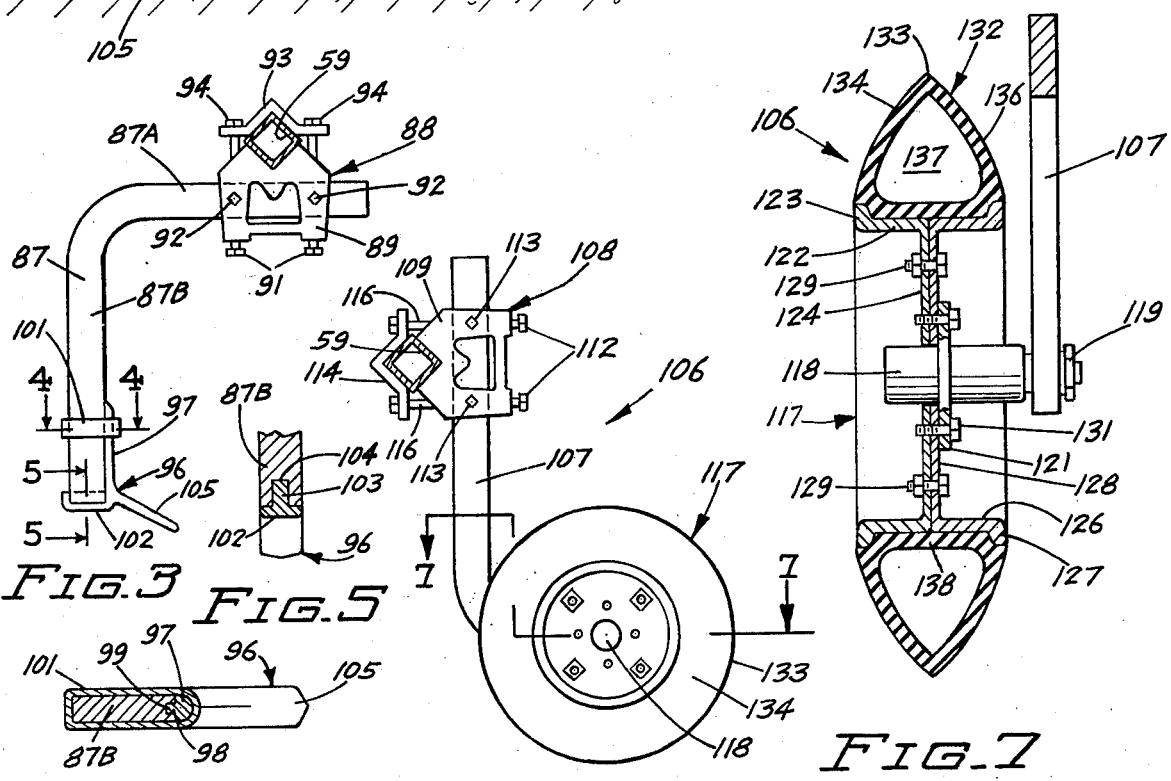

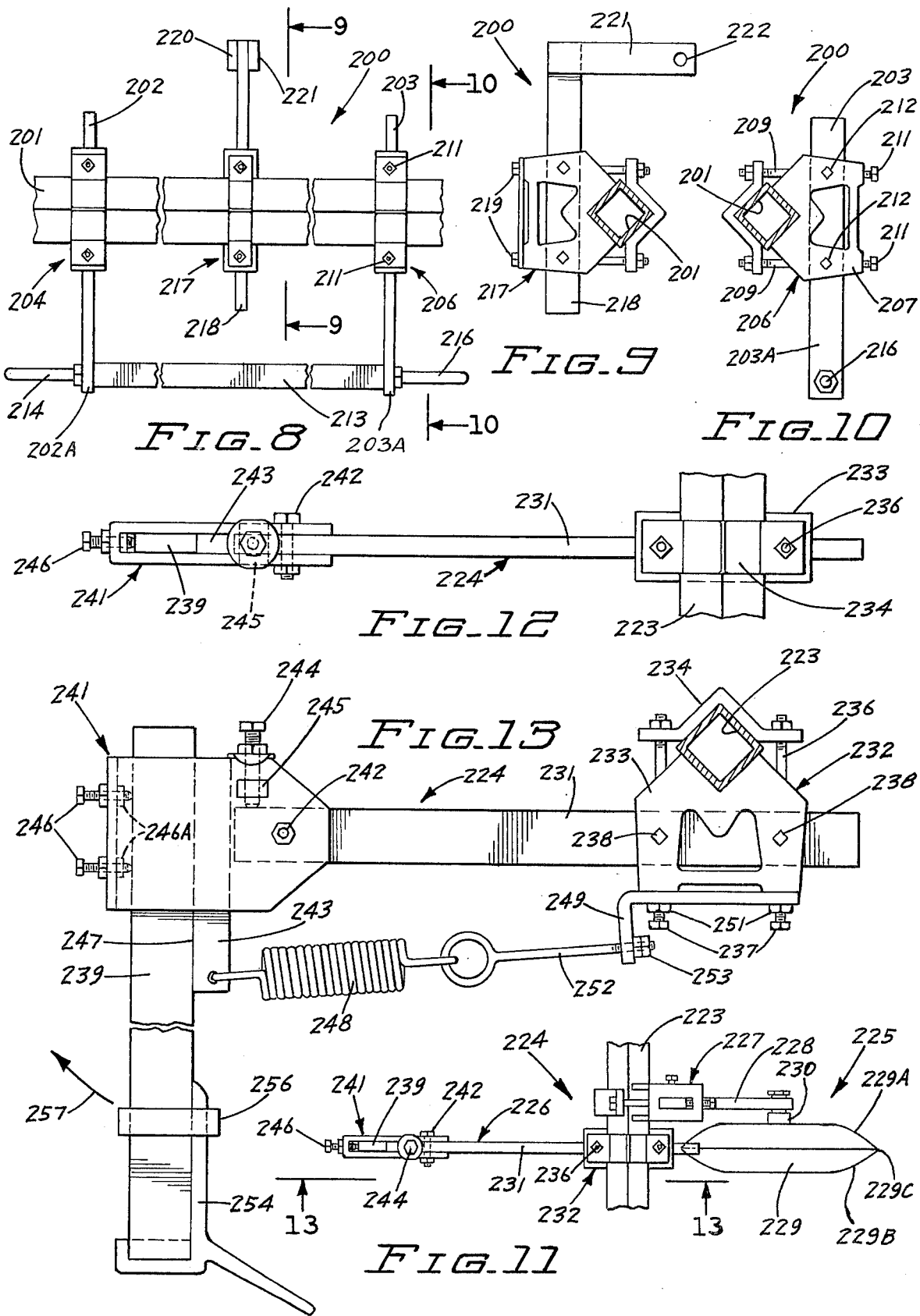

HITCH ASSEMBLY FOR MOUNTING A TRANSVERSE BEAM ON A THREE-POINT HITCH

CROSS REFERENCE TO RELATED APPLICATION:

This application is a continuation-in-part of U.S. application Ser. No. 474,048 filed May 28, 1974 now abandoned.

BACKGROUND OF INVENTION

Row crop cultivators mounted on three-point hitches of tractors are used to cultivate a plurality of rows of crops, as beets, beans, corn and the like. An example of a row crop cultivator is shown in U.S. Pat. No. 3,680,648. The cultivator has a plurality of earthworking tools mounted on a transverse tool bar.

Conservation farming systems utilizing ridge planning for row crops have been developed to optimize management of crop residues, minimize soil losses and erosion and lower farming costs. A prime mover, as a tractor or transporter, having all-terrain tires has a tool bar for carrying different types of equipment including earthworking equipment. The tires of the transporter follow the pre-established traffic patterns between the ridges of the row crops.

SUMMARY OF INVENTION

The invention relates to an earthworking implement attached to a draft vehicle with a hitch assembly. The hitch assembly has a plurality of members adjustable connected with clamps to a main transverse beam. A tool bar is movably connected to the beam and carries a plurality of row guide units.

An object of the invention is to provide a row crop cultivator with an adjustable hitch assembly operable to level the transverse beam of an implement, as a cultivator, planter or the like. A further object of the invention is to provide a versatile and adjustable hitch assembly which can fit variations in three-point tractor hitches and is adaptable to the other mounting structure of draft vehicles. Another object of the invention is to provide a versatile, low cost hitch assembly usable with a variety of implements mountable on the three-point hitch of a draft vehicle. These and other objects and advantages of the invention are found in the following specification of a preferred embodiments of the invention.

IN THE DRAWINGS

FIG. 2 is a sectional view taken along the line 2—2 of FIG. 1;

FIG. 3 is a sectional view taken along the line 3—3 of FIG. 1;

FIG. 4 is an enlarged sectional view taken along the line 4—4 of FIG. 3;

FIG. 5 is an enlarged sectional view taken along the line 5—5 of FIG. 3;

FIG. 6 is a sectional view taken along the line 6—6 of FIG. 1;

FIG. 7 is an enlarged sectional view taken along the line 7—7 of FIG. 6;

FIG. 8 is a foreshortened elevational view of a modified hitch assembly mounted on a transverse beam of an implement;

FIG. 9 is a sectional view taken along the line 9—9 of FIG. 8;

FIG. 10 is a sectional view taken along the line 10—10 of FIG. 8;

FIG. 11 is a top plan view of a modified row guide structure of the invention mounted on a transverse tool bar;

FIG. 12 is an enlarged top plan view of the furrowing tool assembly of the row guide structure of FIG. 11;

and

Figure 1:
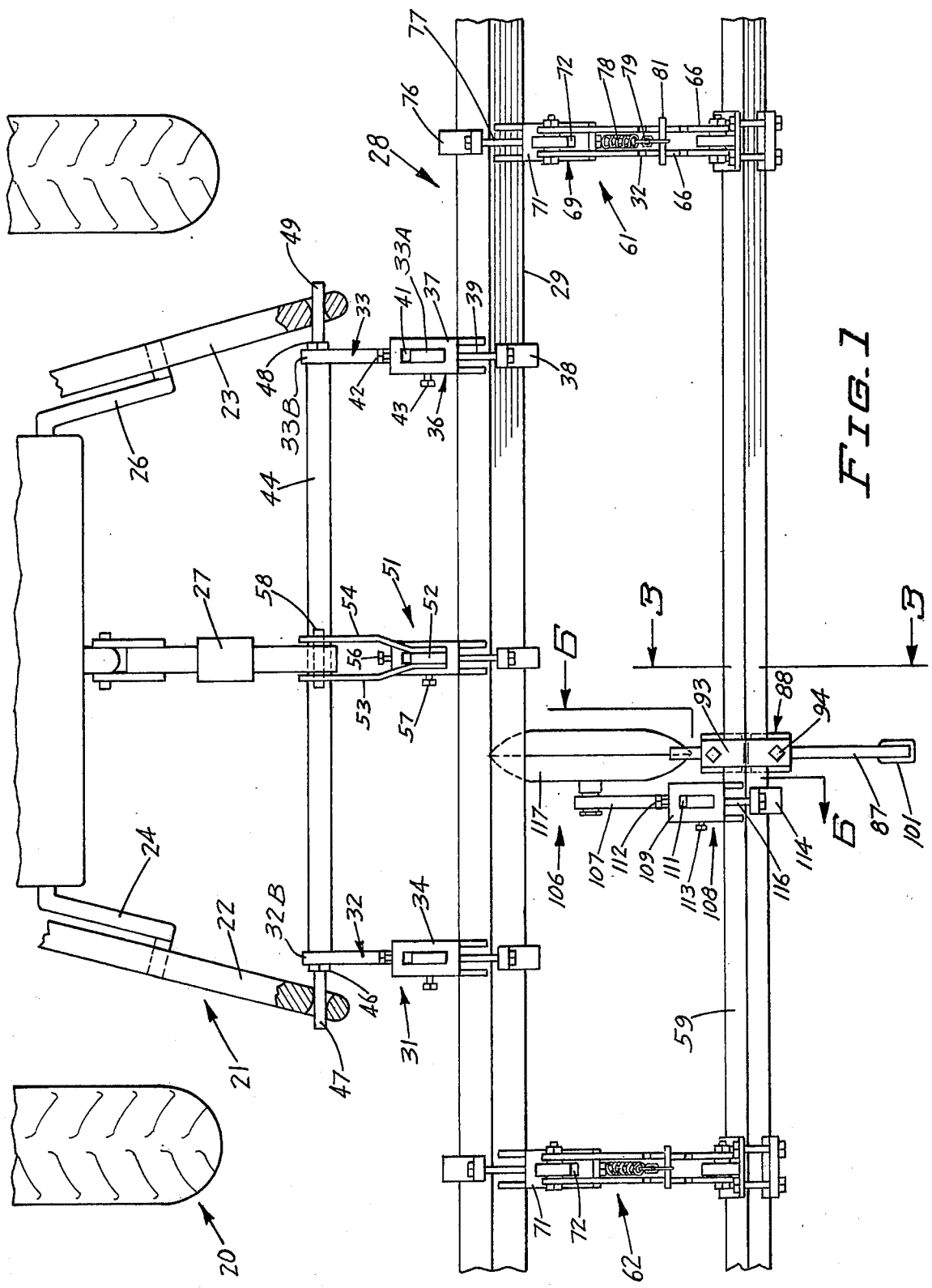
FIG. 1 is a plan view of a fragmentary portion of the earthworking implement of the invention attached to a three-point hitch of a draft vehicle.

FIG. 13 is an enlarged sectional view taken along the line 13—13 of FIG. 11.

DESCRIPTION OF THE PREFERRED EMBODIMENT

Referring to the drawing, there is shown in FIG. 1 a transporter power unit or draft vehicle, as an agricultural tractor, indicated generally at 20 having a pair of drive wheels 20A located on opposite sides of the power transmission housing 20B. A conventional three-point hitch indicated generally at 21 extends rearwardly from the transmission housing 20B. Three-point hitch 21 has a pair of draft links 22 and 23 connected to lift links 24 and 26. Located between lift links 24 and 26 is a rearwardly directed center control link 27.

An earthworking implement indicated generally at 28 is mounted on three-point hitch 21. Implement 28 has a transverse beam 29 carrying a hitch assembly indicated generally at 31. Hitch assembly 31 is mounted on the draft links 22 and 23 and control link 27. Hitch assembly 31 comprises a pair of generally L-shaped members 32 and 33. A first clamp 34 secures the L-shaped member 32 to the beam 29. In a similar manner, a second clamp 36 secures the member 33 to beam 29. Clamps 34 and 36 are identical in structure. The following description is limited to clamp 36.

Clamp 36 is a clamp as shown in U.S. Pat. No. 3,642,333 and No. 3,825,358. Clamp 36 has a body 37 located on one side of beam 29. A back or retaining member 38 is located on the opposite side of beam 29. A pair of bolts 39 clamp the body 37 to member 38 to fix the position of the clamp on beam 29. The body 37 has an upright opening or passage 41 for accommodating the upright section 33A of the L-shaped member 33. Adjusting and holding bolts 42 cooperate with captive nuts (not shown) held in body 37 to engage the forward edge of upright section 33A and longitudinally clamp section 33A in the body 37. A pair of side adjusting and holding bolts 43 cooperate with nuts (not shown) captivated in body 37 and engage one side of section 33A to laterally or transversely clamp section 33A in body 37. L-shaped members 32 and 33 have forwardly directed lower sections or legs 32B and 33B, respectively. The forward portions of sections 32B and 33B have transverse holes for accommodating bolts (not shown) threaded into a transverse member 44. A bolt 46 holds one end of member 44 on section 32B. An outwardly directed end or projection 47 cooperates with the holding portion of the draft link 22 to mount one side of the hitch assembly 31 to draft link 22. The opposite end of member 44 is held on section 33B with a bolt 48. An outwardly directed arm or projection 49 cooperates with the end of draft link 23 to mount the opposite or right end, as shown in FIG. 1, on draft link 23.

A third clamp indicated generally at 51 is located midway between clamps 34 and 36. Clamp 51 accommodates upright L-shaped member 52 having a pair of forwardly directed arms 53 and 54. Adjusting and holding bolts 56 and 57 engage the front edge and side of upright member 52 to clamp the member 52 to the body of clamp 51. Clamp 51 is identical in structure to clamps 34 and 36. The forward ends of arms 53 and 54 have transverse aligned holes accommodating a pin 58. Pin 58 pivotally connects the control link 27 to the arms 53 and 54. Each of the upright portions 32A and 33A is selectively positioned in its respective clamp 34, 36, 51 so that the beam 29 can be leveled on the three-point hitch 21. The upright center member 52 is adjustable in clamp 51, thereby adjusting the location and elevation of the control link to provide for angular or pivotal control of the beam 29. The individual adjustment of the L-shaped members 32 and 33 and upright member 52 permits the hitch assembly 31 to fit variations in the structure of three-point hitches of different types of tractors.

As shown in FIGS. 1 and 2, a tool bar 59 is located generally parallel to, rearward and below the beam 29. A plurality of parallel linkages indicated generally at 61 and 62 connect tool bar 59 to beam 29. The number of parallel linkages can vary with the length of beam 29. Preferably, two parallel linkages are used for each section of tool bar 29. For example, a tool bar 59 having three sections would have six parallel linkages. Parallel linkages 61 and 62 are identical in structure. The following description is limited to parallel linkage 61 shown in FIG. 2.

Parallel linkage 61 has a first upright member 63 and a second upright member 64 located rearward of the first member 63. A first or top horizontal link 66 connects the upper ends of members 63 and 64. A second or bottom horizontal link 67 connects the lower end of member 63 with an intermediate portion of member 64. Pivot bolts 68 pivotally connect the opposite ends of members 66 and 67 to members 63 and 64.

A clamp indicated generally at 69 mounts the parallel linkage 61 to the beam 29. Clamp 69 is identical in structure to clamps 34 and 36. Clamp 69 has a body 71 having an upright opening or passage 72 for accommodating the upright member 63. Horizontal and transverse adusting and holding bolts 73 and 74 fix the position of member 63 in the body 71. Clamp 69 has a back or retaining member 76 connected with a pair of bolts 77 to the body 71 to thereby fix the position of the clamp on beam 29.

The parallel linkage 61 is biased in a downward direction by a spring 78. The lower end of spring 78 is attached to the lower bolt 73. The upper end of spring 78 is connected to a link chain 79. A transverse rod 81 extends through one of the links. The ends of the rods are located in grooves 82 in the top links 66. The links 66 have a plurality or horizontally spaced grooves so that the position of rod 81 can be changed and thereby change the tension characteristics of spring 78.

The upright member 64 has a downwardly directed lower end 64A secured to a rearwardly open V-notched plate 83. The tool bar 59 is located in the V-notched plate. A back or retaining member 84 is clamped to the plate 83 with a plurality of bolts 86.

The row guide structure, indicated generally at 95, for the row crop implement comprises an earthworking furrowing tool assembly 96 and a forwardly positioned guide and gauge wheel assembly 106 located in longitudinal alignment with each other. A plurality of row guide structures 106 are used to guide the tool bar 59 and tools or units attached to the tool bar 59 relative to the rows of plants. Two furrowing assemblies 96 are used to make longitudinal furrows for the front wheels of the tractor. The tractor is guided along the field by two longitudinal furrows made in a previous cultivation, planting, or herbicide operation.

Furrowing tool assembly 96 has generally right angle standard 87 for attaching a tool 96 to tool bar 59. Standard 87 has a forwardly directed horizontal section 87A and a generally vertical section 87B. A clamp indicated generally at 88 attaches the standard 87 to the tool bar 59. Clamp 88, as shown in FIG. 3, has a body 89 having an opening or passage for accommodating forwardly directed portion or section 87A of standard 87. Adjusting bolts 91 and 92 vertically and horizontally fix the position of section 87A on body 89. A back or retaining member 93 is connected to body 89 with a pair of bolts 94. The bolts clamp the body and retaining member on tool bar 59.

Tool 96 is located on the lower end of standard section 87B. Tool 96 has an upwardly directed shank 97 having a rearwardly directed projection 98. Projection 98, as shown in FIG. 4, extends into a hole 99 in the standard section 87B. A continuous annular collar 101 extends about section 87B and shank 97 to hold the projection in hole 99. The collar 101 is frictionally held on the standard 97 and tool 96. The lower end of shank 97 is integral with a rearwardly directed base 102. Base 102 has an upwardly directed rib 103 located in a groove 104. As shown in FIG. 5, groove 104 is located in the bottom of standard section 87B. The tool 96 has a forwardly and downwardly directed nose 105 which extends into the soil 100.

Tool 96 can be readily and quickly removed from standard 87. This is accomplished by forcing collar 101 in an upward direction. The tool can pivot in a forward direction so that the projection 98 is removed from hole 99. The tool can then be moved downwardly off the standard 87.

Referring to FIGS. 2, 6 and 7, the guide and gauge wheel assembly indicated generally at 106 has an upright generally L-shaped standard 107. A clamp 108 attaches the standard 107 to the tool bar 59. Clamp 108 is identical in structure to clamp 88. Clamp 108 has a body 109 having an opening 111 accommodating standard 107. Adjusting and holding bolts 112 and 113 fix the position of standard 107 on body 109. A back or retaining member 114 is connected to body 109 with a pair of bolts 116.

A wheel 117 is located adjacent the forward portion of the lower end of standard 107. Wheel 117 has a bearing or hub 118 attached to the standard 107 with nut and bolt assembly 119. The midsection of bearing 118 has an annular outwardly directed flange 121. Wheel 117 is connected to flange 121. Wheel 117 has a first rim 122 having an outside upwardly directed rib or flange 123. The inside of rim 122 has an inwardly directed circular flange 124. A second rim 126 has an outside outwardly directed flange 127 similar to flange 123. The inside of rim 126 has an inwardly directed flange 128. A plurality of circumferentially spaced nut and bolt assemblies 129 secure flanges 124 and 128 in face-to-face relationship. Lugs or bolts 131 connect both flanges 124 and 128 to the hub flange 121.

A resilient tire indicated generally at 132 is mounted on rims 122 and 126 between the flanges 123 and 127. The tire has a central outwardly directed apex or annular rib section 133 and convex sides 134 and 136. Sides 134 and 136 converge toward and join at the rib section 133. The base 138 of tire 132 extends between flanges 123 and 127. Tire 132 has an annular chamber 137. As shown in FIG. 7, chamber 137 has a generally triangular shape. The walls of the tire are flexible material, such as rubber or synthetic plastics. Also, the walls of the tire have substantially uniform thickness. The tire 132 follows the furrow previously made in the soil to thereby position the tool bar 59 relative to the rows of crops. Tool 96 functions to make a longitudinal furrow between selected rows of crops for subsequent cultivation. The resilient tire 132 functions to follow the previously made furrow without cutting into the soil and drifting from the furrow. The resiliency of the tire permits it to deform and move over irregularities in the soil and obstacles without laterally shifting the position of the tool bar 59. This provides for accurate tracking of the cultivator and precision cultivation. Wheel 117 also functions as a guage wheel for determining the height of the tool bar 59. The height of the tool bar 59 is adjustable by repositioning standard 107 relative to the clamp 108.

The tool bar 59 can accommodate various types of earthworking tools. For example, the dual disc tools shown in U.S. Pat. No. 3,642,333 can be mounted on the tool bar 59. The herbicide incorporator shown in U.S. Pat. No. 3,741,137 can be mounted on the tool bar 59. Also, other implements as seeder units, and trenching and damming units can be mounted on the tool bar 59.

Referring to FIGS. 8 to 10, there is shown a modification of the hitch assembly indicated generally at 200 for mounting the transverse beam 201 of a machine, earthworking implement or planter onto the three-point hitch of a draft vehicle, such as the three-point hitch of an agricultural tractor. Hitch assembly 200 comprises a pair of generally upright members or bars 202 and 203. The members 202 and 203 have lower ends 202A and 203A projected downwardly from the beam 201. A first clamp indicated generally at 204 mounts the member 202 on beam 201. In a similar manner, a second clamp 206 mounts the member 203 on beam 201. The clamps 204 and 206 are identical and can be the clamps shown in U.S. Pat. No. 3,642,333 or in U.S. Pat. No. 3,825,358. The following description is limited to clamp 206.

As shown in FIG. 10, clamp 206 has a body 207 accommodating the member 203. A V-shape back 208 is clamped to the beam 201 with bolts 209 which extend from body 207 to the back 208 on opposite sides of beam 201. Body 207 carries longitudinal or first adjusting and holding bolts 211 which clamp the member 203 in the body in a first direction. Second side adjusting and holding bolts 212 clamp the member 203 in the body 207 in a second or side direction. The bolts 211 and 212 cooperate with captive nuts (not shown) located in recesses within body 207.

Referring to FIG. 8, a cross bar 213 extends between the lower ends 202A and 203A of the members 202 and 203. A first pin 214 extends through a hole in the end 202 and is threaded into one end of cross bar 213. In a similar manner, a second pin 216 projects through a hole in the end 203A and is threaded into the opposite end of cross bar 213. The pins 214 and 216 are adapted to be mounted on the draft links of a three-point hitch in the manner similar to the pins 47 and 49 as shown in FIG. 1. Located between the clamps 204 and 206 is a third clamp 217 mounted on beam 201. Third clamp 217 carries an upright member 218 adapted to be connected to the control link of the three-point hitch. The clamp 217 is identical in structure with the clamp 206. The upright member 218 is secured to the clamp 217 with adjusting and holding bolts 219. Bolts 219 permit the upright member 218 to be vertically adjusted thereby adjust the position of the member 28 according to the requirements of the three-point hitch or earthworking implement. The members 202 and 203 are also vertically adjustable relative to the beam 201 as the adjusting and holding bolts 211 and 212 can be released so that the members 202 and 203 can move relative to the bodies of the clamps.

A pair of forwardly directed arms 220 and 221 are secured to the top of the upright member 218. Arms 220 and 221 have transverse holes 222 in the forward ends thereof to accommodate a pin to pivotally connect the control link to the arms. Holes 222 are in general vertical alignment with the pins 214 and 216. In other words, pins 214 and 216 and holes 222 are positioned in generally the same vertical plane.

Referring to FIGS. 11 to 13 there is shown a modification of the row guide structure indicated generally at 224 for guiding the earthworking implement so that earthworking tools will work the soil between the rows of crops or for guiding other implements as seeders, herbicide incorporators and the like in the field. The tools can be the dual discs or weeder blades shown in U.S. Pat. No. 3,642,333. Row guide structure 224 is mounted on a transverse tool bar 223. The tool bar is connected with a plurality of parallel linkages, as parallel linkages 61 and 62 shown in FIGS. 1 and 2, to the beam of the implement. The row guide structure 224 has a guide and gauge wheel assembly indicated generally at 225 and a furrowing tool assembly indicated generally at 226. A clamp 227 mounts the guide and gauge wheel assembly 225 to the tool bar 226. Guide and gauge wheel assembly includes a generally L-shaped standard 228 and a wheel 229. Wheel 229 is rotatably mounted on a lateral axle 230 secured to the lower forwardly directed portion of standard 228. As shown in FIG. 11, wheel 229 has convex sides 229A and 229B that join at a central peripheral rib or rim 229C. Wheel 229 can be the same structure as the wheel 132 shown in FIG. 7.

Furrowing tool assembly 226 has a rearwardly directed generally flat bar or member 231. The forward end of bar 231 is mounted in a clamp 232. The clamp 227 and 232 are identical in construction and can be the same as clamps shown in U.S. Pat. Nos. 3,642,333 and 3,825,358. Clamp 232 has a body 233 and a back 234. A pair of bolts 236 attached to the body and back mount the clamp 232 on the tool bar 223. Bar 231 is adjustably held in the body 232 with first adjusting and holding bolts 237 and second adjusting and holding bolts 238. An upright standard 239 is located adjacent the rear end of bar 231. A holder indicated generally at 241 connects the standard 239 to the bar 231. Holder 241 is a generally U-shaped member having side flanges that are pivotally mounted on the rear portion of bar 231 with a transverse bolt and nut assembly 242. A generally upright back member or bar 243 is located between the flanges 242 and are secured to the flanges. Bar 243 is spaced from the rear portion of holder 241 to provide a generally rectangular upright opening for accommodating standard 239. A stop bolt 244 mounted on the top of holder 241 is threaded through a block 245 located in holes in the side flanges of holder 241. The lower end of the stop bolt 244 engages the top of bar 232 to hold the standard 239 in a generally forward and upright normal earthworking position.

A pair of bolts 246 mounted on the back of holder 244 extend through captive nuts 246A to clamp the standard 239 into in engagement with the flat face or surface 247 of the bar 243. Standard 239 is resiliently urged or biased in a forward direction by a tension spring 248. One end of the spring 248 is connected to the lower end of bar 243. The opposite end of the spring is connected to a generally L-shape bracket 249. Nuts 251 threaded on the bolts 237 secure the bracket 249 to the body 233 of clamp 232. An eye bolt 252 connects the spring 248 to the bracket 249. Nuts 253 threaded on the eye bolt adjust the tension of spring 248.

An earthworking tool 254 is releasably mounted on the lower end of standard 239. The tool is retained on the standard with a collar 256. The tool 254 is identical in construction to the tool 96 as shown in FIGS. 3, 4 and 5.

In use, as shown in FIG. 14, wheel 229 is located in longitudinal alignment with the standard 239. One forward movement of the implement wheel 229 follows a longitudinal furrow in the earth made in a previous cultivation or planting operation. Furrowing tool assembly 226 makes a new longitudinal furrow into the earth so that the guide wheel of the next cultivation will guide the earthworking implement in a predetermined position relative to the rows of crops. When the earthworking tool 254 hits a solid object, as a rock, the standard 239 will move backward or pivot about the bolt 242 in the direction of the arrow 257 as shown in FIG. 16. Tool 254 will move upwardly over the object. Spring 248 will bias the standard 239 back to its generally upright position once the tool 254 has passed over the object. The standard 239 will return to its generally upright position as determined by the stop bolt 244.

While there has been shown and described a preferred embodiments of the hitch assembly, implement and furrowing tool assembly, it is understood that modifications, changes in material, size and parts may be made by those skilled in the art without departing from the invention.

The embodiments of the invention in which an exclusive property or privilege is claimed are defined as follows:

1. Hitch means for mounting a transverse beam on a three-point hitch having a pair of draft links and a control link of of a draft vehicle comprising: a pair of first members, each of said members having a forwardly directed portion and an upright portion, first clamp means for connecting the upright portion of one of said members to the beam, said one member being movable relative to the first clamp means to a selected position, said first clamp means having releasable means holding said one member in the selected position, second clamp means for connecting the upright portion of the other of said members to the beam, said other member being movable relative to the second clamp means to a selected position, said second clamp means having releasable means holding said other member in the selected position, transverse bar means extended between the forwardly directed portions of the first members, means connected to the bar means at the outer end portions thereof to attach the bar means to the forwardly directed portions of the first members, means connected to the outer end portions of the bar means and mounted on the forwardly directed portions of the first members connectable to the draft links of a three-point hitch, a second member having an upright portion and a forwardly directed portion, third clamp means for connecting the upright portion of the second member to the beam, said second member being movable relative to the third clamp means to a selected position, said third clamp means having releasable means holding the second member in the selected position, said forwardly directed portion of said second member being connectable to the control link of a three-point hitch.

2. The hitch means of claim 1 wherein: the first members each has a general L-shape.

3. The hitch means of claim 1 wherein: the first and second clamp means each has first means to longitudinally hold the upright portions of the first members and second means to transversely hold the upright portions of the first members.

4. The hitch means of claim 1 wherein: the means mounted on the forwardly directed portions of the first members include transverse outwardly projected members.

5. The hitch means of claim 1 wherein: the means mounted on the forwardly directed portions of the first members include said means connected to the bar means to attach the bar means to the first members.

6. The hitch means of claim 1 wherein: the third clamp means has first means to longitudinally hold the upright portion of the second member and second means to transversely hold the upright portion of the second member.

7. Hitch means for mounting a transverse beam on a three-point hitch having a pair of draft links and a control link of a draft vehicle comprising: a pair of first members, each of said first members having an upright portion and a lower section, first clamp means for connecting the upright portion of one of said members to the beam, said one member being movable relative to the first clamp means to a selected position, said first clamp means having releasable means holding said one member in the selected position, second clamp means for connecting the upright portion of the other of said members to the beam, said other member being movable relative to the second clamp means to a selected position, said second clamp means having releasable means holding said other member in the selected position, transverse bar means extended between the lower sections of the first members, means connected to the bar means at the outer end portions thereof to attach the bar means to said lower sections of the first members, means connected to the outer end portions of the bar means and mounted on the lower sections of the first members connectable to the draft links of a three-point hitch, a second member having an upright portion and a forwardly directed portion, third clamp means for connecting the upright portion of the second member to the beam, said second member being movable relative to the third clamp means to a selected position, said third clamp means having releasable means holding the second member in the selected position of said second member, said forwardly directed portion being connectable to the control link of a three-point hitch.

8. The hitch means of claim 7 wherein: the first and second clamp means each has first means to longitudinally hold the upright portions of the first members and second means to transversely hold the upright portions of the first members.

9. The hitch means of claim 7 wherein: the means mounted on the lower sections of the first members include transverse outwardly projected members connectable to the draft links.

10. The hitch means of claim 7 wherein: the means mounted on the lower sections of the first members include said means connected to the bar means to attach the bar means to the first members.

11. The hitch means of claim 7 wherein: the third clamp means has first means to longitudinally hold the upright portion of the second member and second means to transversely hold the upright portion of the second member.

12. The hitch means of claim 7 wherein: said means connected to the bar means to attach the bar means to the lower sections of the first members comprises a bolt means attached to the ends of the bar means to secure the bar means to the lower sections of the first members, said bolt means having outwardly directed projections adapted to be connected to the draft links, which projections comprise said means connected to the outer end portions of the bar means.

13. The hitch means of claim 1 wherein: said means connected to the bar means to attach the bar means to the forwardly directed portions of the first members comprises a bolt means attached to the ends of the bar means to secure the bar means to the forwardly directed portions of the first members, said bolt means having outwardly directed projections adapted to be connected to the draft links, which projections comprise said means connected to the outer end portions of the bar means.

* * * * *